United States Patent
Takata et al.

(10) Patent No.: US 11,050,534 B2
(45) Date of Patent: Jun. 29, 2021

(54) TERMINAL AND COMMUNICATION METHOD FOR PUNCTURING AND TRANSMITTING A REFERENCE SIGNAL

(71) Applicant: Panasonic Intellectual Property Corporation of America, Torrance, CA (US)

(72) Inventors: Tomohumi Takata, Ishikawa (JP); Takashi Iwai, Ishikawa (JP); Hidetoshi Suzuki, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/494,792

(22) PCT Filed: Mar. 8, 2018

(86) PCT No.: PCT/JP2018/008927
§ 371 (c)(1),
(2) Date: Sep. 17, 2019

(87) PCT Pub. No.: WO2018/203440
PCT Pub. Date: Nov. 8, 2018

(65) Prior Publication Data
US 2020/0083997 A1    Mar. 12, 2020

(30) Foreign Application Priority Data

May 2, 2017 (JP) .............................. JP2017-091778

(51) Int. Cl.
*H04W 4/00* (2018.01)
*H04L 5/00* (2006.01)
*H04W 72/04* (2009.01)

(52) U.S. Cl.
CPC .......... *H04L 5/0048* (2013.01); *H04L 5/0007* (2013.01); *H04L 5/0053* (2013.01); *H04W 72/042* (2013.01); *H04W 72/0453* (2013.01)

(58) Field of Classification Search
CPC ... H04L 5/0048; H04L 5/0007; H04L 5/0053; H04W 72/042; H04W 72/0453
See application file for complete search history.

(56) References Cited

U.S. PATENT DOCUMENTS

2012/0329400 A1* 12/2012 Seo ........................... H04L 5/00
455/63.1
2018/0048436 A1* 2/2018 Park .................... H04W 52/146
(Continued)

OTHER PUBLICATIONS

International Search Report of PCT application No. PCT/JP2018/008927 dated May 15, 2018.
(Continued)

*Primary Examiner* — Abdelnabi O Musa
(74) *Attorney, Agent, or Firm* — Seed IP Law Group LLP

(57) ABSTRACT

A terminal includes: a circuit that, on the basis of a parameter of a first frequency resource assigned a reference signal (SRS) and a parameter of a second frequency resource, adjacent to the first frequency resource, that uses a subcarrier spacing (SCS) which is different from that used by the first frequency resource, punctures the reference signal at a boundary between the first frequency resource and the second frequency resource; and a radio transmitter that transmits the reference signal thus punctured.

14 Claims, 18 Drawing Sheets

(56) References Cited

U.S. PATENT DOCUMENTS

| | | | | |
|---|---|---|---|---|
| 2018/0184410 A1* | 6/2018 | John Wilson | ............ | H04L 5/001 |
| 2019/0037562 A1* | 1/2019 | Park | .................. | H04W 72/0446 |
| 2019/0098608 A1* | 3/2019 | Yi | .......................... | H04L 5/0044 |
| 2019/0150029 A1* | 5/2019 | Zhang | .................... | H04L 1/0027 |
| | | | | 375/260 |

OTHER PUBLICATIONS

3GPP TSG-RAN WG4 NR AH, R4-1700217, "On multiplexing of numerologies", Jan. 2017.

3GPP RAN WG1 #48bis, R1-071339, "Selection between Truncation and Cyclic Extension for UL RS", Mar. 2007.

3GPP TSG RAN WG1 Meeting #88, R1-1702084, "Further discussion on SRS transmission", Feb. 2017.

3GPP TSG RAN WG1 Meeting #83, R1-157471, "Summary of informal email discussion on time and frequency relationships for MTC", Nov. 2015.

3GPP TSG RAN WG1 Meeting #84, R1-160478, "Remaining issues for NB-PUSCH", Feb. 2016.

TSG-RAN WG1 Meeting #59bis, R1-100611, "Considerations on mitigating multi-cell SRS interference and increasing SRS capacity", Jan. 2010.

\* cited by examiner

FIG. 13

| SCS each resource #1 and resource#2 | Offset size in resource#1 [PRB] | Offset size in resource#2 [PRB] |
|---|---|---|
| SCS:15kHz (resource#1)<br>SCS:30kHz (resource#2) | 1 | 2 |
| SCS:15kHz (resource#1)<br>SCS:60kHz (resource#2) | 0 | 3 |
| SCS:30kHz (resource#1)<br>SCS:60kHz (resource#2) | 1 | 2 |

FIG. 14

| SCS [kHz] | Offset size [PRB] |
|---|---|
| 15 | 1 |
| 30 | 2 |
| 60 | 3 |

FIG. 21

| Chanel type each resource #1 and resource#2 | Offset size in resource#1 [PRB] |
|---|---|
| SRS (resource#1)<br>SRS (resource#2) | 2 |
| SRS (resource#1)<br>PUCCH (resource#2) | 4 |
| SRS (resource#1)<br>PUSCH (resource#2) | 3 |

FIG. 22

| Chanel type each resource #1 and resource#2 | Offset size in resource#1 [PRB] | Offset size in resource#2 [PRB] |
|---|---|---|
| SRS (resource#1)<br>SRS (resource#2) | 2 | 2 |
| SRS (resource#1)<br>PUCCH (resource#2) | 4 | 0 |
| SRS (resource#1)<br>PUSCH (resource#2) | 3 | 1 |

TERMINAL AND COMMUNICATION METHOD FOR PUNCTURING AND TRANSMITTING A REFERENCE SIGNAL

TECHNICAL FIELD

The present disclosure relates to a terminal and a communication method.

BACKGROUND ART

For the standardization of 5G, a new radio access technology (NR: New Radio), which does not necessarily have backward compatibility with LTE/LTE-Advanced, has been discussed by the 3GPP.

In order to support a plurality of services (enhanced mobile broadband (eMBB), ultra-reliable and low latency communications (URLLC), and massive machine type communications (mMTC)) of different required specifications, NR supports a plurality of numerologies, such as subcarrier spacings (hereinafter referred to as "SCSs"), that vary from service to service.

Further, NR considers multiplexing a plurality of services of different SCSs into a frequency domain. In a case where signals of different SCSs are multiplexed into a frequency domain, inter-numerology interference occurs due to a breakdown of orthogonality of subcarriers. In particular, the amount of interference becomes larger at a boundary (hereinafter sometimes referred to as "SCS boundary") between frequency resources of different SCSs. For reduction of interference, a method for providing a guard band at a boundary between frequency resources of different SCSs has been considered (see, for example, NPL 1).

In LTE, a terminal (sometimes referred to as "UE (user equipment)") transmits a reference signal called "sounding reference signal (hereinafter referred to as "SRS")" with a radio resource assigned from a base station (sometimes referred to as "eNB" or "gNB"). The base station estimates uplink quality in the transmission band of the SRS by measuring the reception quality of the SRS. The base station uses an estimated value of the uplink quality to perform frequency scheduling or link adaptation (adaptive modulation and coding) of the terminal. Further, in LTE, the terminal can render the SRS untransmitted (sometimes referred to as "dropped") in a case where there is an overlap in transmission timing or transmission resource between the SRS and a different channel (such as a PUCCH (physical uplink control channel)).

An SRS of LTE involves the use of a Zadoff-Chu (ZC) sequence, which has the advantage of being low in CM/PAPR (cubic metric/peak to average power ratio) and good in cross-correlation property.

CITATION LIST

Non Patent Literature

NPL 1: R4-1700217, Ericsson, "On multiplexing of numerologies", RAN4 #NR AH, January 2017
NPL 2: R1-071339, Motorola, "Selection between Truncation and Cyclic Extension for UL RS", RAN1 #48bis, March 2007
NPL 3: R1-1702084, CATT, "Further discussion on SRS transmission", RAN1 #88, February 2017

SUMMARY OF INVENTION

As with LTE, NR considers SRS transmission. However, NR has given no close consideration to a method for generating an SRS code sequence in a case where an SRS is placed at a boundary between frequency resources of different SCSs or a case where there is an overlap in frequency resource between an SRS and a non-SRS channel.

An embodiment of the present disclosure facilitates providing a terminal and a communication method that make it possible to appropriately generate an SRS code sequence in a case where an SRS is placed at a boundary between frequency resources of different SCSs or a case where there is an overlap in frequency resource between an SRS and a non-SRS channel.

A terminal according to an embodiment of the present disclosure includes: a circuit that, on the basis of a parameter of a first frequency resource assigned a reference signal and a parameter of a second frequency resource, adjacent to the first frequency resource, that uses a subcarrier spacing which is different from that used by the first frequency resource, punctures the reference signal at a boundary between the first frequency resource and the second frequency resource; and a transmitter that transmits the reference signal thus punctured.

A terminal according to an embodiment of the present disclosure includes: a circuit that punctures that part of a frequency resource assigned a reference signal which overlaps a frequency resource assigned a different channel other than the reference signal; and a transmitter that transmits the reference signal thus punctured.

A terminal according to an embodiment of the present disclosure includes: a circuit that, on the basis of a puncture size in which to puncture a reference signal, changes to a different method for generating the reference signal; and a transmitter that transmits the reference signal generated by using the different method.

A communication method according to an embodiment of the present disclosure includes: on the basis of a parameter of a first frequency resource assigned a reference signal and a parameter of a second frequency resource, adjacent to the first frequency resource, that uses a subcarrier spacing which is different from that used by the first frequency resource, puncturing the reference signal at a boundary between the first frequency resource and the second frequency resource; and transmitting the reference signal thus punctured.

A communication method according to an embodiment of the present disclosure includes: puncturing that part of a frequency resource assigned a reference signal which overlaps a frequency resource assigned a different channel other than the reference signal; and transmitting the reference signal thus punctured.

A communication method according to an embodiment of the present disclosure includes: on the basis of a puncture size in which to puncture a reference signal, changing to a different method for generating the reference signal; and transmitting the reference signal generated by using the different method.

It should be noted that general or specific embodiments may be implemented as a system, an apparatus, a method, an integrated circuit, a computer program, a storage medium, or any selective combination thereof.

An embodiment of the present disclosure makes it possible to appropriately generate an SRS code sequence in a case where an SRS is placed at a boundary between frequency resources of different SCSs or a case where there is an overlap in frequency resource between an SRS and a non-SRS channel.

Additional benefits and advantages of the disclosed embodiments will become apparent from the specification and drawings. The benefits and/or advantages may be indi-

BRIEF DESCRIPTION OF DRAWINGS

FIG. 13 shows an example of a relationship between SCSs and offset values according to Specific Example 1 of Embodiment 1.

FIG. 14 shows another example of a relationship between SCSs and offset values according to Specific Example 1 of Embodiment 1.

FIG. 21 shows an example of a relationship between channels and offset values according to Specific Example 3 of Embodiment 1.

FIG. 22 shows another example of a relationship between channels and offset values according to Specific Example 3 of Embodiment 1.

DESCRIPTION OF EMBODIMENTS

The following describes embodiments of the present disclosure in detail with reference to the drawings.

Figure 1:
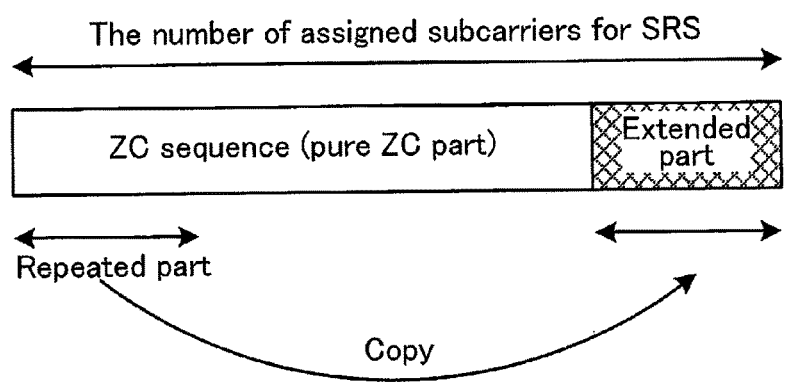
FIG. 1 shows an example of an extended ZC sequence.

An SRS of LTE involves the use of a Zadoff-Chu (ZC) sequence, which has the advantage of being low in CM/PAPR (cubic metric/peak to average power ratio) and good in cross-correlation property. Further, the length of a ZC sequence for an SRS is a prime number and is fitted to the size of a PRB (physical resource block, 1 PRB=12 subcarriers) assigned a resource for the SRS; therefore, as shown in FIG. 1, an extended ZC sequence (extended code sequence; simply sometimes referred to as "extended ZC") obtained by copying a part (in FIG. 1, the beginning) of the ZC sequence to extend the sequence is used. However, an extended ZC or a truncation ZC (not illustrated) obtained by deleting a part of a ZC sequence are inferior in properties such as CM/PARR and cross-correlation property to a pure ZC sequence (see, for example, NPL 2).

It should be noted that, as shown in FIG. 1, the terms "pure ZC part", "repeated part", and "extended part" refer to a part of a pure ZC sequence to be extended, a part of which a copy is made, and a copied and extended part, respectively.

There are three types of NR assumed: "periodic SRS", which transmits an SRS periodically in accordance with a rule notified or prescribed; "aperiodic SRS", which transmits an SRS a predetermined number of times (e.g. once) in accordance with a trigger from a base station; and "semi-persistent SRS", which transmits an SRS in accordance with a trigger that designates the start and stop of SRS transmission.

Figure 2:
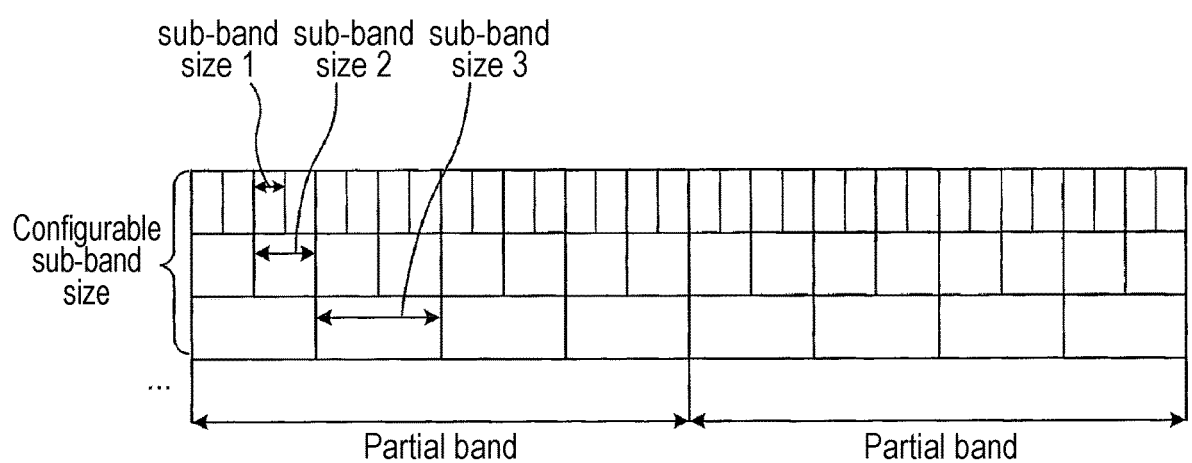
FIG. 2 shows examples of units (granularities) of assigned frequencies for SRSs.

Further, for example, as shown in FIG. 2, units (granularities) of assigned frequencies for SRSs are considered to be frequency units called "sub-bands". Further, in NR, which is wider in system bandwidth than LTE/LTE-Advanced, SRS transmission may be controlled by frequency units called "partial bands" into which a system band has been divided (see, for example, NPL 3). It should be noted that the "partial bands" are sometimes called "carrier bandwidth parts".

Figure 3:
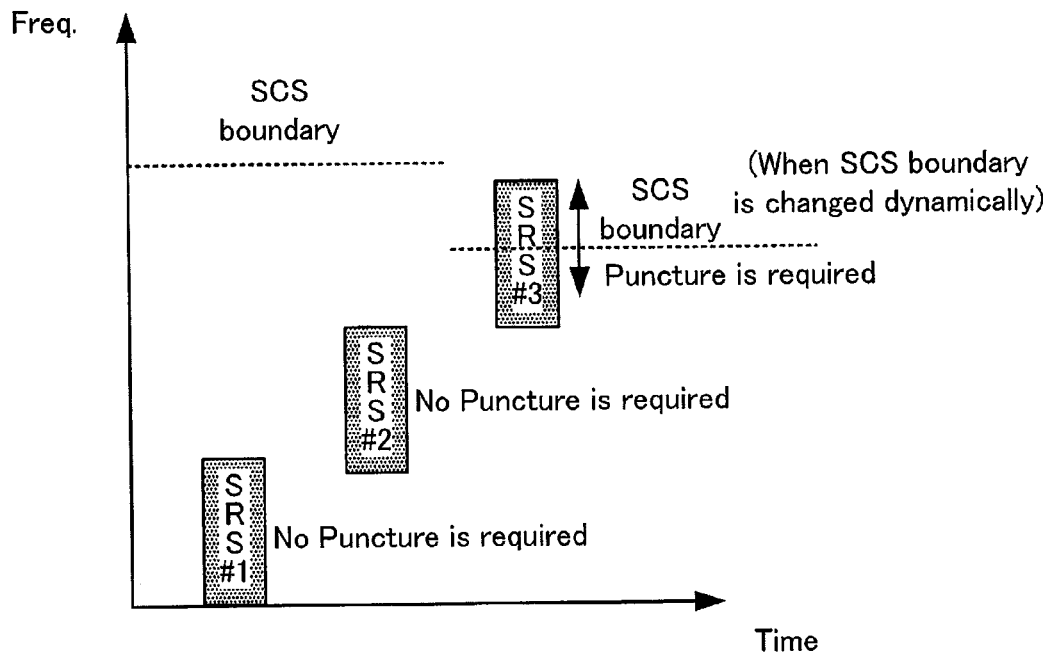
FIG. 3 shows examples of frequency resources for SRSs and an example of an SCS boundary.
Figure 4:
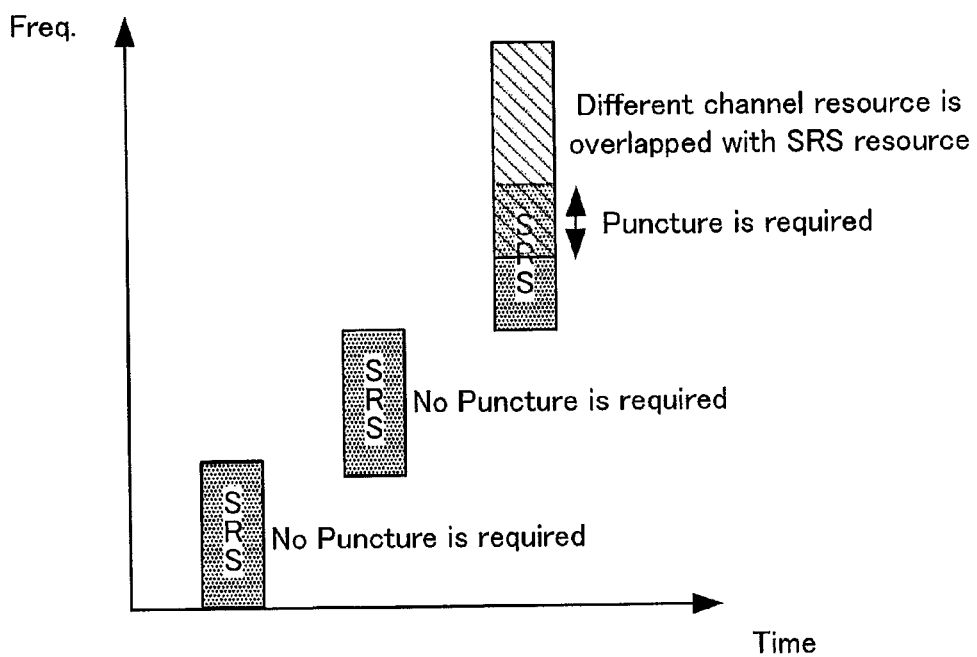
FIG. 4 shows an example of an overlap between a frequency resource for an SRS and a frequency resource for a different channel.

FIGS. 3 and 4 show examples in which a terminal periodically transmits an SRS through the use of frequency and time resources for periodic SRS.

Frequency and time resources for periodic SRS of LTE are statically (or quasi-statically) changed and cannot be dynamically changed. Meanwhile, as shown in FIG. 3, an SCS boundary of NR may be dynamically changed, for example, along with assignments of resources in each service. In this case, as shown in FIG. 3, the dynamic change of the SCS boundary may cause an SRS (in FIG. 3, SRS #3) to be placed around the SCS boundary. In this case, for reduction of inter-numerology interference, a part of a frequency domain assigned the SRS needs to be rendered untransmitted (also referred to as "punctured").

Further, in a case where an SRS is not placed around an SCS boundary but, as shown in FIG. 4, there is an overlap in frequency resource (frequency band) between the SRS and a different channel, a part of a frequency resource assigned the SRS needs to be punctured.

However, in a case where an SRS becomes punctured, there is concern for deterioration in CM/PAPR and cross-correlation property of an extended ZC sequence. To address this problem, an embodiment of the present disclosure describes an efficient puncture method in which an SRS becomes punctured and an extended ZC sequence generation method in which to perform a puncture.

Embodiment 1

[Overview of Communication System]

A communication system according to each of the embodiments of the present disclosure includes a terminal 100 and a base station 200.

Although the present embodiment describes a case where periodic SRS is assumed, the present embodiment is not limited to periodic SRS but is similarly applicable to aperiodic SRS or semi-persistent SRS.

Figure 5:
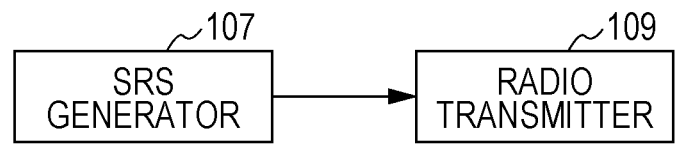
FIG. 5 shows a configuration of a part of a terminal according to Embodiment 1.

FIG. 5 is a block diagram showing a configuration of a part of a terminal 100 according to an embodiment of the present disclosure. As shown in FIG. 5, the terminal 100 includes: an SRS generator 107 that, on the basis of a parameter of a first frequency resource assigned a reference signal (SRS) and a parameter of a second frequency resource, adjacent to the first frequency resource, that uses a subcarrier spacing (SCS) which is different from that used by the first frequency resource, punctures the reference signal at a boundary between the first frequency resource and the second frequency resource; and a radio transmitter 109 that transmits the reference signal thus punctured.

[Configuration of Terminal]

Figure 6:
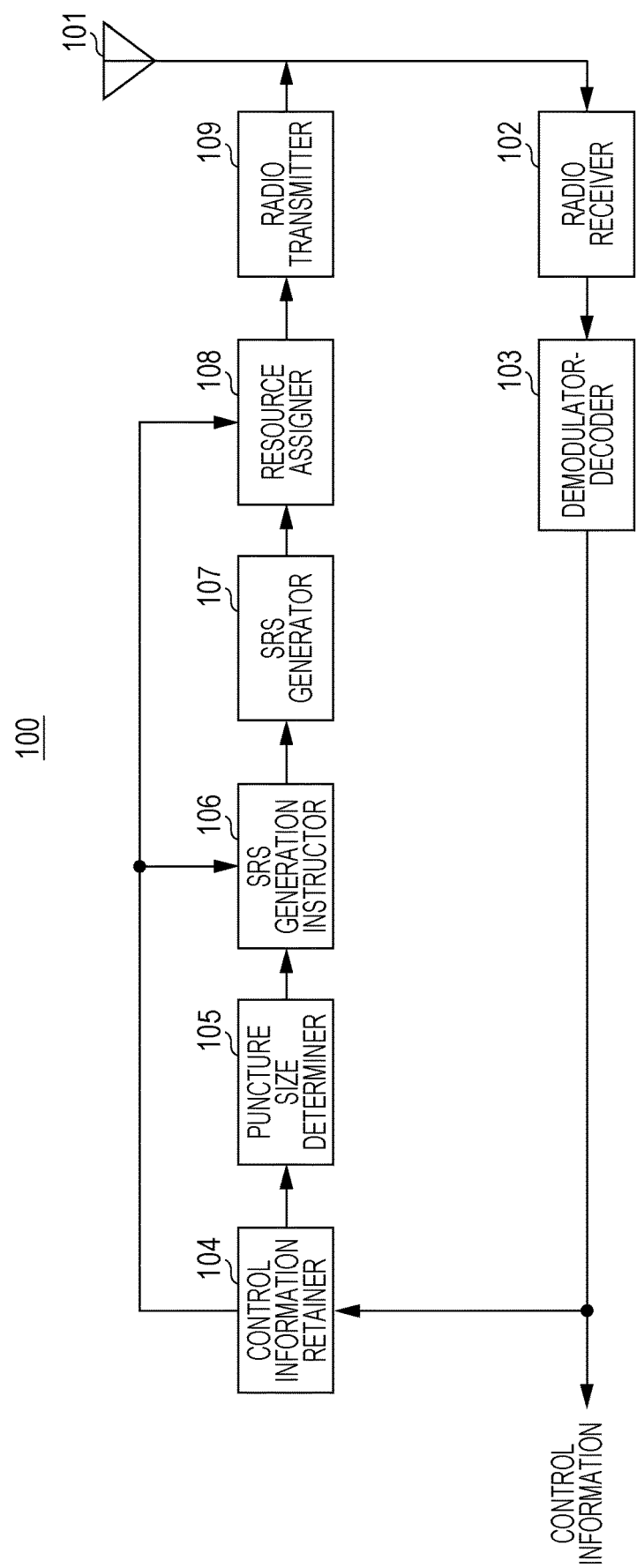
FIG. 6 shows a configuration of the terminal according to Embodiment 1.

FIG. 6 is a block diagram showing a configuration of the terminal 100 according to the present embodiment. As shown in FIG. 6, the terminal 100 includes an antenna 101, a radio receiver 102, a demodulator-decoder 103, a control information retainer 104, a puncture size determiner 105, an SRS generation instructor 106, the SRS generator 107, a resource assigner 108, and the radio transmitter 109.

The radio receiver 102 performs receiver processing such as down-conversion and analog-to-digital conversion on a received signal received via the antenna 101 and outputs the received signal to the demodulator-decoder 103.

The demodulator-decoder 103 demodulates and decodes the received signal inputted from the radio receiver 102 and extracts, from a decoding result, SRS resource information transmitted from the base station 200 and addressed to the terminal 100 and control information for determining the puncture size of an SRS code sequence and an SRS. The demodulator-decoder 103 outputs the information thus extracted to the control information retainer 104 and another component (not illustrated).

The SRS resource information contains, for example, frequency resource information (such as an SRS bandwidth, a sub-band number within a system band, and a partial band number), time resource information (such as a slot number and an OFDM (orthogonal frequency division multiplexing) symbol number), code sequence information (such as a sequence number), and the like in accordance with which the terminal 100 transmits an SRS. It should be noted that the terminal 100 does not need to be notified of all of the SRS resource information. For example, the terminal 100 may be notified of a part of the SRS resource information as cell common information or as quasi-static notification information. Further, a part of the SRS resource information may be specification-prescribed system common information of which the terminal 100 does not need to be notified.

Details of the control information for determining the puncture size of an SRS code sequence and an SRS will be described later.

The control information retainer 104 retains control information (such as an SRS frequency resource and a hopping pattern), contained in the information inputted from the demodulator-decoder 103, that is used for periodic SRS transmission. The control information that the control information retainer 104 retains contains quasi-static control information and dynamic control information. The control information retainer 104 outputs the control information thus retained to the puncture size determiner 105, the SRS generation instructor 106, or the resource assigner 108 on an as-needed basis.

The puncture size determiner 105 determines the puncture size of an SRS on the basis of the control information inputted from the control information retainer 104. Details of how the puncture size determiner 105 determines the puncture size of an SRS will be described later. The puncture size determiner 105 outputs the puncture size thus determined to the SRS generation instructor 106.

The SRS generation instructor 106 sets, on the basis of the control information inputted from the control information retainer 104 and the puncture size inputted from the puncture size determiner 105, information needed for SRS generation, such as the size of a pure ZC part, the puncture size (or the size of an extended part), and the sequence number, and outputs the information to the SRS generator 107.

The SRS generator 107 generates an SRS code sequence (e.g. a ZC sequence) on the basis of the information needed for SRS generation, such as the size of the pure AC part, the puncture size, and the sequence number, inputted from the SRS generation instructor 106. The SRS generator 107 outputs the code sequence thus generated to the resource assigner 108 as an SRS.

The resource assigner 108 maps, to the time and frequency resources contained in the SRS resource information inputted from the control information retainer 104, the SRS (code sequence) inputted from the SRS generator 107 and outputs the signal thus mapped to the radio transmitter 109. It should be noted that the signal to which the SRS has been mapped may be subjected to IFFT (inverse fast Fourier transform) (not illustrated).

The radio transmitter 109 performs digital-to-analog conversion and up-conversion on the signal inputted from the resource assigner 108 and transmits the radio signal thus obtained to the base station 200 through the antenna 101.

[Configuration of Base Station]

Figure 7:
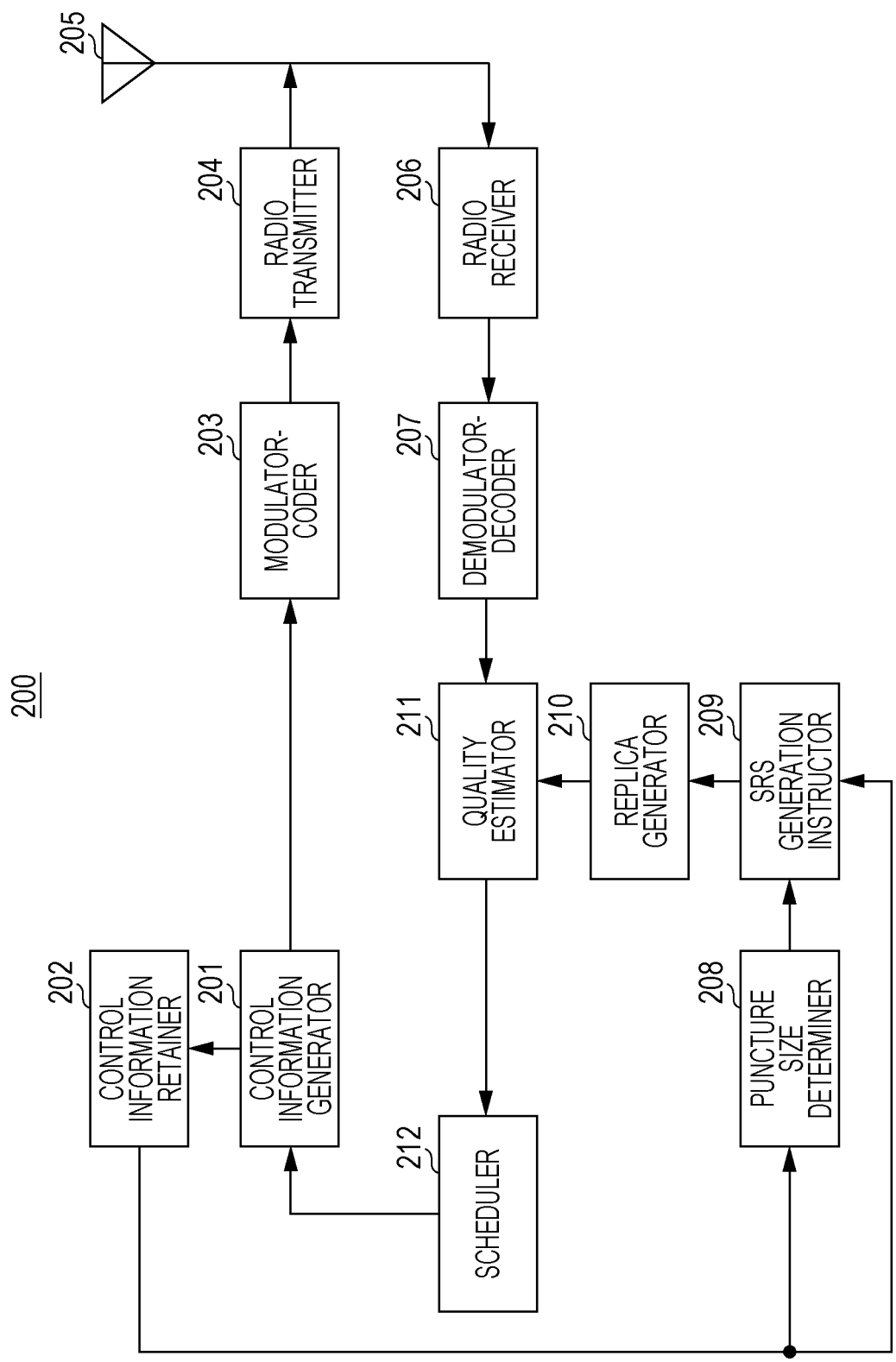
FIG. 7 shows a configuration of a base station according to Embodiment 1.

FIG. 7 is a block diagram showing a configuration of the base station 200 according to the present embodiment. As shown in FIG. 7, the base station 200 includes a control information generator 201, a control information retainer 202, a modulator-coder 203, a radio transmitter 204, an antenna 205, a radio receiver 206, a demodulator-decoder 207, a puncture size determiner 208, an SRS generation instructor 209, a replica generator 210, a quality estimator 211, and a scheduler 212.

The control information generator 201 generates, in accordance with an instruction from the after-mentioned scheduler 212, a control signal for notifying the terminal 100 of SRS resource information and control information (which is similar to the control information received by the aforementioned terminal 100) for determining the puncture size of an SRS code sequence and an SRS and outputs the information to the control information retainer 202 and the modulator-coder 203.

As mentioned earlier, the base station 200 does not need to notify the terminal 100 of all of the SRS resource information at a time. A part of information common to a plurality of the terminals 100, such as a partial band size and quasi-static notification information (such as an SRS frequency resource and a hopping pattern) that is used for periodic SRS transmission, may be notified to a plurality of terminals 100 that are accommodated by the base station 200 as cell-specific information. Further, the control information may be notified in combination with one or more of DCI (downlink control information), MAC (medium access control), and RRC (radio resource control).

The control information retainer 202 retains the control information inputted from the control information generator 201 and outputs the control information thus retained to the puncture size determiner 208 or the SRS generation instructor 209 on an as-needed basis.

The modulator-coder 203 modulates and codes the control signal inputted from the control information generator 201 and outputs the signal thus coded to the radio transmitter 204.

The radio transmitter 204 performs transmitter processing such as digital-to-analog conversion, up-conversion, and amplification on the signal inputted from the modulator-coder 203 and transmits a radio signal obtained by the transmitter processing to the terminal 100 through the antenna 205.

The radio receiver 206 performs receiver processing such as down-conversion and analog-to-digital conversion on the signal from the terminal 100 received via the antenna 205 and outputs the received signal to the demodulator-decoder 207.

The demodulator-decoder 207 demodulates and decodes the received signal inputted from the radio receiver 206 and outputs the signal thus decoded to the quality estimator 211.

The puncture size determiner 208 determines the puncture size of an SRS (replica signal) on the basis of the control information inputted from the control information retainer 202. It should be noted that the puncture size determiner 208 determines the puncture size, for example, according to a generating method agreed upon in recognition between the terminal 100 and the base station 200 in advance according to a system convention, notification from the base station 200 to the terminal 100, or the like. The puncture size determiner 208 outputs the puncture size thus determined to the SRS generation instructor 209.

The SRS instructor 209 sets, on the basis of the control information inputted from the control information retainer 202 and the puncture size inputted from the puncture size determiner 208, information needed for SRS generation, such as the size of a pure ZC part, the puncture size (or the size of an extended part), and the sequence number, and outputs the information to the replica generator 210.

On the basis of the information needed for SRS generation, such as the size of the pure ZC part, the puncture size, and the sequence number, inputted from the SRS generation instructor 209, the replica generator 210 generates, as a replica signal, a sequence (e.g. a ZC sequence) that is identical to an SRS code sequence that is generated as an SRS by the terminal 100. The replica generator 210 outputs the replica signal thus generated to the quality estimator 211.

On the basis of the SRS resource information of which the terminal 100 has been notified, the quality estimator 211 extracts an SRS received signal from the decoded signal inputted from the demodulator-decoder 207. Moreover, the quality estimator 211 calculates a quality estimate value from a result of correlation computation between the SRS received signal thus extracted and the replica signal inputted from the replica generator 210. The quality estimator 210 outputs the quality estimation result thus calculated to the scheduler 212.

The scheduler 212 performs scheduling (such as MCS (modulation and coding scheme) setting, frequency resource assignment, and transmission power control) on data on the basis of the quality estimation result inputted from the quality estimator 211. Further, the scheduler 212 determines SRS resource information for each terminal 100 in consideration of assigned frequencies for the data and outputs the SRS resource information to the control information generator 201.

[Operation of Terminal 100 and Base Station 200]

Operation of the terminal 100 thus configured and the base station 200 thus configured is described in detail.

Figure 8:
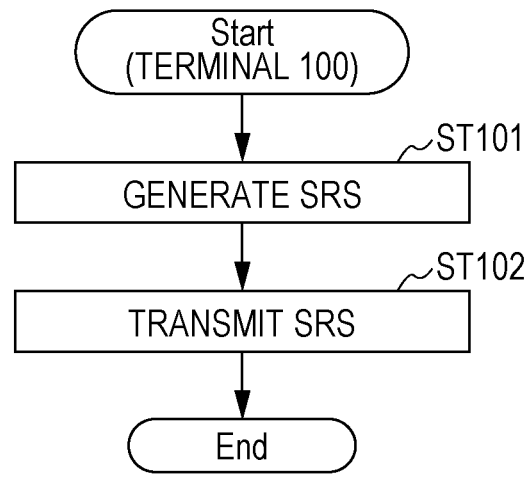
FIG. 8 shows an example of operation of the terminal according to Embodiment 1.
Figure 9:
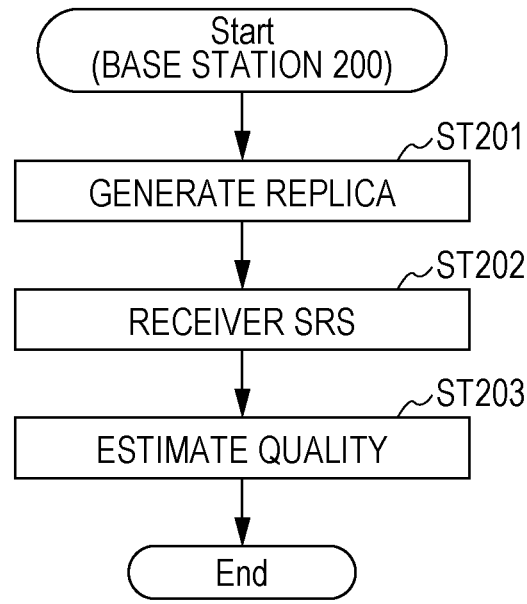
FIG. 9 shows an example of operation of the base station according to Embodiment 1.

FIG. 8 is a flow chart showing operation of the terminal 100 (FIG. 6), and FIG. 9 is a flow chart showing operation of the base station 200 (FIG. 7).

The terminal 100 generates an SRS to be transmitted to the base station 200 (ST101). In so doing, the terminal 100 determiners the puncture size of the SRS at a boundary (SCS boundary) between frequency resources of different SCSs on the basis of a parameter that is used by a frequency resource assigned the SRS and a parameter that is used by a frequency resource adjacent to the frequency resource assigned the SRS and different in SCS.

The terminal 100 punctures the SRS in the puncture size thus determined and transmits the SRS thus punctured to the base station 200 (ST102).

Meanwhile, the base station 200 generates a replica signal that is similar to the SRS transmitted from the terminal 100 (ST201). Further, the base station 200 receives the SRS transmitted from the terminal 100 (ST202). Then, the base station 200 estimates uplink quality through the use of the SRS thus received and the replica thus generated (ST203).

[Method for Determining Puncture Size]

The following describes in detail a method (i.e. a process in ST101 and ST201) by which the terminal 100 (puncture size determiner 105) and the base station 200 (puncture size determiner 208) determine a puncture size for an SRS (replica signal).

In an environment where a plurality of signals of different SCSs are multiplexed into a frequency domain, the terminal 100 determines a puncture size according to a frequency resource assigned to an SRS that the terminal 100 transmits and the position of an SCS boundary. Further, the terminal 100 may further change the puncture size on the basis of puncture control information (e.g. a parameter for an adjacent frequency resource) of which it has been notified by the base station 200.

Figure 10:
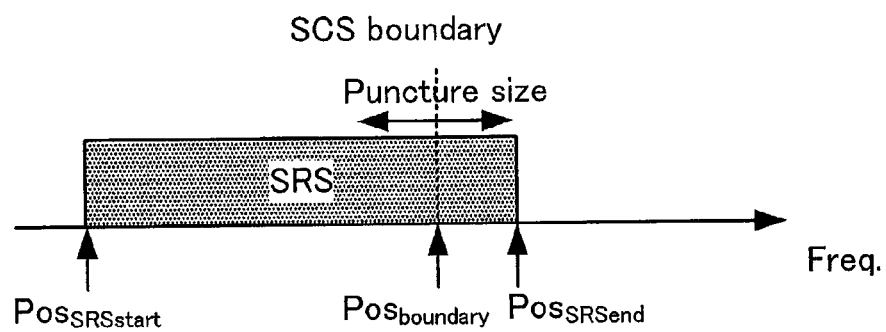
FIG. 10 shows an example of an SRS puncture process according to Embodiment 1.
Figure 11:
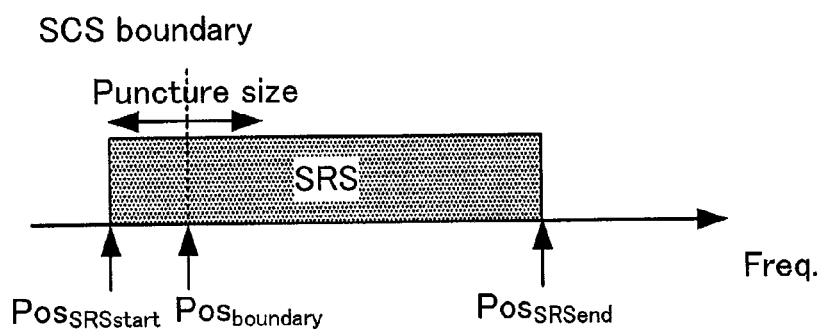
FIG. 11 shows an example of an SRS puncture process according to Embodiment 1.

FIGS. 10 and 11 show examples of the method for determining a puncture size. FIG. 10 shows an example in which the rear end (end side; here, a high-frequency side) of an SRS is punctured, and FIG. 11 shows an example in which the front end (start side; here, a low-frequency side) of an SRS is punctured. That is, the terminal 100 performs a puncture process as shown in FIG. 10 or 11, depending on the position of an SCS boundary in a frequency resource assigned an SRS (i.e. a positional relationship with an adjacent frequency resource).

For example, as shown in FIGS. 10 and 11, the terminal 100 calculates the puncture size ($P_{size}$) according to Eq. (1), depending on the frequency resource assigned the SRS (the assignment start position and assignment end position of the SRS) and the position of the SCS boundary:

[Math. 1]

$$P_{size} = \begin{cases} Pos_{SRSend} - Pos_{boundary} + \text{offset} & \text{for end side} \\ Pos_{boundary} - Pos_{SRSstart} + \text{offset} & \text{for start side} \end{cases} \quad (1)$$

where $Pos_{SRSstart}$ is the assignment start position of the SRS, $Pos_{SRSend}$ is the assignment end position of the SRS, $Pos_{boundary}$ is the position of a boundary between different SCSs, and offset is an offset value (offset size).

In a case where the puncture size thus calculated is greater than 0 ($P_{size}$>0), the terminal 100 punctures the SRS. That is, as indicated by Eq. (1), the terminal 100 punctures that part of the frequency resource assigned to the SRS which extends from the SCS boundary into the adjacent frequency resource (which corresponds to "$POS_{SRSend}-Pos_{boundary}$" or "$Pos_{boundary}-Pos_{SRSstart}$") and an opposite part (which corresponds to offset).

It should be noted that the SRS assignment start position ($Pos_{SRSstart}$), the SRS assignment end position ($Pos_{SRSend}$), the position of the boundary between different SCSs ($Pos_{boundary}$), and the offset value (offset) may be notified in combination with one or more of DCI, MAC, RRC, and system information (MIB (master information block) or SIB (system information block)).

Further, by being notified by the base station 200 of the puncture size ($P_{size}$) instead of being notified by the base station 200 of the position of the boundary between frequency resources using different SCSs ($Pos_{boundary}$) and the offset value (offset), the terminal 100 may puncture the SRS on the basis of the puncture size of which it has been notified. This eliminates the need for the position of the boundary between different SCSs, the offset value, and puncturing control information, thus allowing reduction of an overhead of signaling.

The following describes Specific Examples 1 to 4 in which the terminal 100 (puncture size determiner 105) determines (adjusts) a puncture size on the basis of puncturing control information of which it has been notified by the base station 200.

It should be noted that the following assumes, for simplicity of explanation, that the assignment end position ($Pos_{SRSend}$) of the SRS of FIG. 10 or the assignment start position ($Pos_{SRSstart}$) of the SRS of FIG. 11 and the SCS boundary position ($Pos_{boundary}$) are identical to each other. That is, in Eq. (1), "$Pos_{SRSend}-Pos_{boundary}$" or "$Pos_{boundary}-Pos_{SRSstart}$" is zero. In other words, the following describes the setting of the offset value (offset) in Eq. (1). Note, however, that Specific Examples 1 to 4 are applicable even in a case where the assignment end position ($Pos_{SRSend}$) of the SRS or the assignment start position ($Pos_{SRSstart}$) of the SRS and the SCS boundary position ($Pos_{boundary}$) are different from each other.

Specific Example 1

Figure 12:
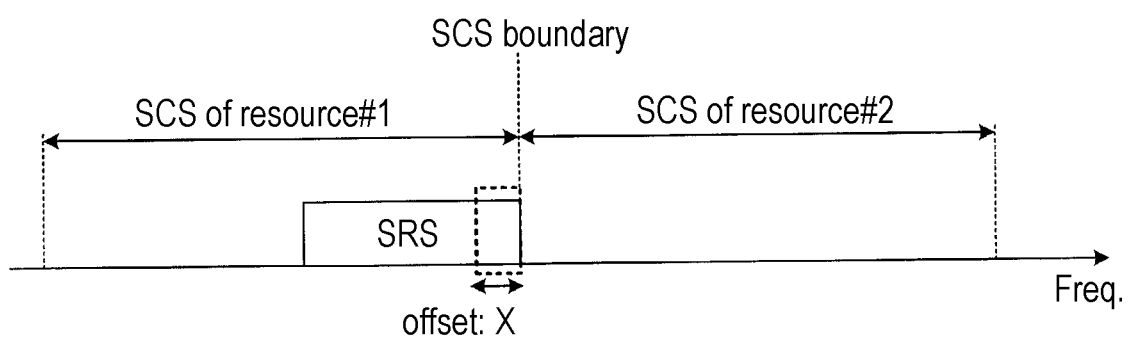
FIG. 12 shows an example of a puncture size determination method according to Specific Example 1 of Embodiment 1.

In Specific Example 1, as shown in FIG. 12, the terminal 100 determines a puncture size by setting an offset value (offset size X) on the basis of the SCS of a frequency resource assigned an SRS (SCS of resource #1) or the SCS of an adjacent frequency resource (SCS of resource #2).

Specific Example 1 increases the puncture size ($P_{size}$) by increasing the offset value for the SRS assigned to a frequency resource of a large SCS.

FIG. 13 shows a correspondence relationship between SCSs and offset values (offset sizes) that are set. In FIG. 13, since the SCS of resource #2 is larger than the SCS of resource #1, the offset value for resource #2 is set to be greater than the offset value for resource #1. Further, as shown in FIG. 13, as the difference (ratio) between the SCSs of the frequency resources becomes greater, the difference between offset values that are set for each separate resource may become greater.

It should be noted that in a case where the terminal 100 has already been notified of the offset values, the terminal 100 may overwrite the offset values with values shown in FIG. 13 or may add values shown in FIG. 13 to the offset values of which it has already been notified.

Further, although FIG. 13 has shown a case where the SCS of resource #2 is larger than the SCS of resource #1, this is not intended to impose any limitation, and in a case where the SCS of resource #1 is larger than the SCS of resource #2, the offset values need only be set in a similar manner. That is, as the SCS of a frequency resource assigned an SRS becomes larger than the SCS of an adjacent frequency resource, the offset values are set to be greater and the puncture size in which to puncture the SRS becomes larger.

Further, in a case where the adjacent frequency resources are equal in SCS to each other, the offset values may be 0, as there is no need to take the occurrence of inter-numerology interference into account.

Further, in a case where the puncture size ($P_{size}$) is designated, the puncture size may be prescribed instead of the offset values in FIG. 13.

Further, an SCS-based offset value may be set as shown in FIG. 14 according to the SCS of a frequency resource (in FIG. 12, the SCS of resource #1) with which the terminal 100 transmits an SRS, regardless of the assignment of an adjacent SRS. In FIG. 14, as the SCS of a frequency resource with which the terminal 100 transmits an SRS becomes larger, the offset value is set to be greater and the puncture size ($P_{size}$) in which to puncture the SRS becomes larger.

Further, the respective SCSs of frequency resources (e.g. the SCS of resource #1 and the SCS of resource #2 shown in FIG. 12), which are puncturing control information, may be generated by the control information generator 201 of the base station 200 and notified in combination with one or more of DCI, MAC, RRC, and system information (MIB or SIB). Further, the frequency resources may be defined as frequency resources for each separate partial band, for each separate sub-bands, and for each separate service (eMBB, URLLC, and mMTC).

The following describes an effect that is brought about by changing offset values (puncture sizes) according to SCSs.

Figure 15:
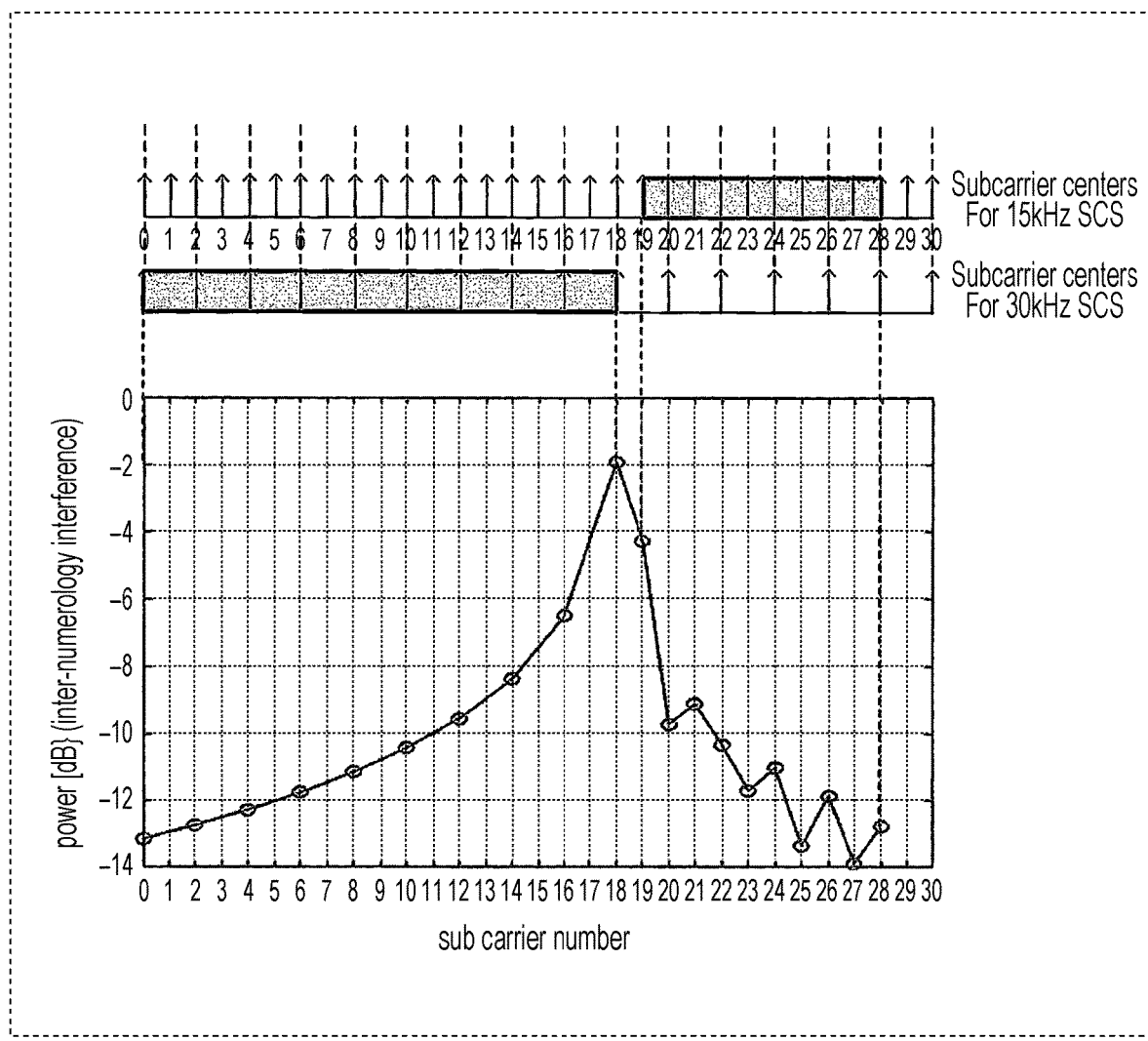
FIG. 15 shows a result of a computation simulation of inter-numerology interference according to Specific Example 1 of Embodiment 1.
Figure 16:
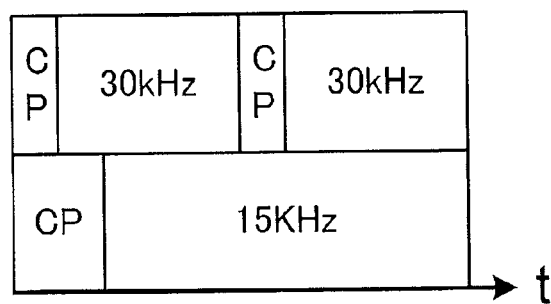
FIG. 16 shows examples of signals of different SCSs according to Specific Example 1 of Embodiment 1.

FIG. 15 shows a computation simulation result of evaluating inter-numerology interference that occurs in a case where, as shown in FIG. 16, signals of 15 kHz SCS (subcarrier numbers 19 to 28) and signals of 30 kHz SCS (subcarrier numbers 0 to 18) are multiplexed into adjacent frequency resources.

FIG. 15 shows that greater inter-numerology interference occurs at a boundary between the signals of 15 kHz SCS and the signals of 30 kHz SCS (i.e. an SCS boundary position). Further, FIG. 15 also shows that inter-numerology interference that occurs in the frequency resource of 30 kHz SCS is not the same as but is greater than inter-numerology interference that occurs in the frequency resource of 15 kHz SCS.

Figure 17:
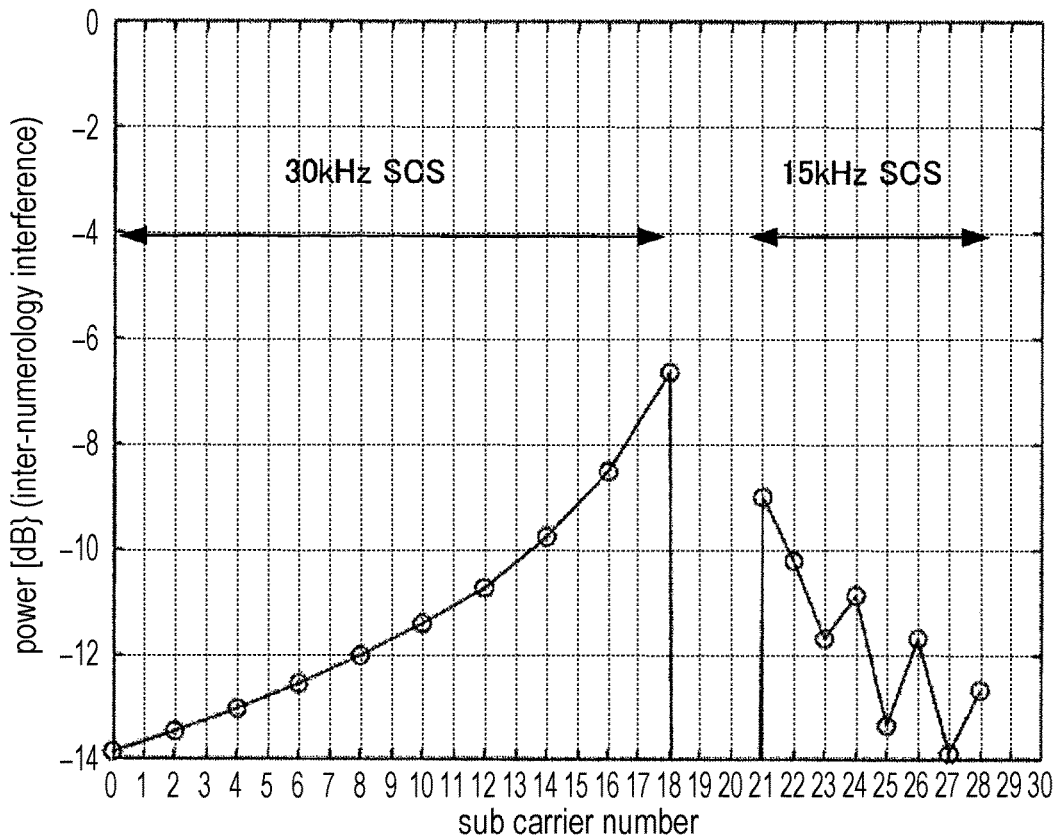
FIG. 17 shows a result of a computation simulation of post-puncture inter-numerology interference according to Specific Example 1 of Embodiment 1.
Figure 18:
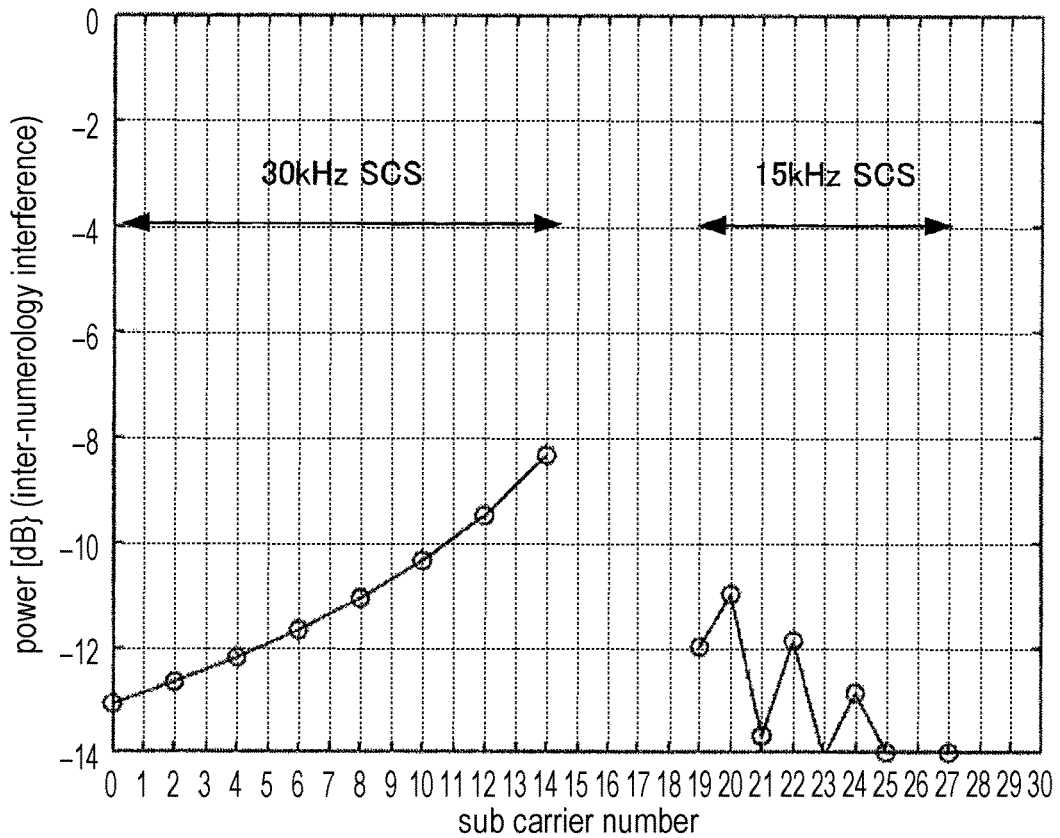
FIG. 18 shows a result of a computation simulation of post-puncture inter-numerology interference according to Specific Example 1 of Embodiment 1.

FIG. 17 shows a computation simulation result of evaluating inter-numerology interference that occurs in a case where, of the signals shown in FIG. 15, some (two subcarriers (which corresponds to subcarrier numbers 19 and 20)) of the signals assigned to 15 kHz SCS that are located near the SCS boundary have been punctured. FIG. 18 shows a computation simulation result of evaluating inter-numerology interference that occurs in a case where, of the signals shown in FIG. 15, some (two subcarriers (which corresponds to subcarrier numbers 15 to 18)) of the signals assigned to 30 kHz SCS that are located near the SCS boundary have been punctured.

That is, in FIGS. 17 and 18, the same number of subcarriers (two subcarriers) are punctured.

A comparison between FIGS. 17 and 18 shows that in a case where the same number of subcarriers (in FIGS. 17 and 18, two subcarriers) are punctured, inter-numerology interference can be more suppressed and the accuracy of estimation of quality by SRSs can be more improved by increasing the puncture sizes of signals of a large SCS (here, 30 kHz SCS).

Thus, in Specific Example 1, the terminal 100 and the base station 200 increase the puncture size by setting a greater offset value X for an SRS as the SCS of a frequency resource assigned the SRS becomes larger than the SCS of an adjacent frequency resource or as the SCS of the frequency resource assigned the SRS becomes larger. This makes it possible to suppress inter-numerology interference and suppress deterioration in the accuracy of estimation of quality of an SRS by a puncture.

It should be noted that the offset values shown in FIGS. 13 and 14 are examples and are not intended to be limited to these values.

Specific Example 2

Figure 19:
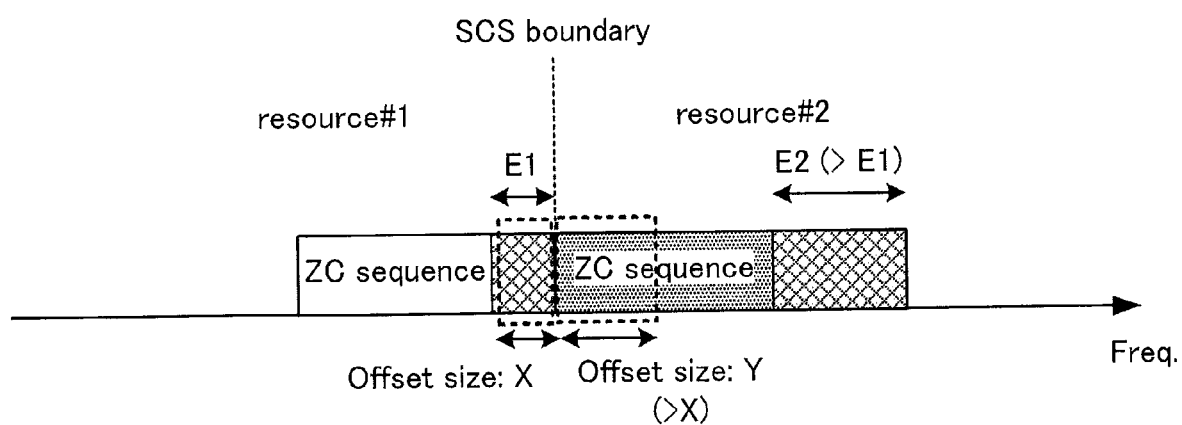
FIG. 19 shows an example of an SRS puncture process according to Specific Example 2 of Embodiment 1.

In Specific Example 2, as shown in FIG. 19, the terminal 100 determines a puncture size by setting an offset value (X) on the basis of the extended part size of an extended code sequence (extended ZC sequence) being used for a frequency resource assigned an SRS or an SRS assigned to an adjacent frequency resource.

Specifically, the terminal 100 makes the offset value greater for an SRS of a larger extended part size. For example, in FIG. 19, the extended part size E1 of a ZC sequence that is used for an SRS assigned to resource #1 is smaller than the extended part size E2 of a ZC sequence that is used for an SRS assigned to resource #2. Therefore, an offset value (puncture size) X for the SRS assigned to resource #1 is set to be smaller than an offset value (puncture size) Y for the SRS assigned to resource #2.

It should be noted that an offset value based on an extended part size may be set according to the extended part size of an SRS of a frequency resource with which the terminal 100 transmits the SRS, regardless of the extended part size of an SRS assigned to an adjacent frequency resource. That is, as the extended part size of an SRS that the terminal 100 transmits becomes larger, the offset value is set to be greater and the puncture size ($P_{size}$) in which to puncture the SRS becomes larger.

Further, the extended part size of a ZC sequence that is used for an SRS assigned to an adjacent frequency resource, which is puncturing control information, may be generated by the control information generator 201 of the base station 200 and notified in combination with one or more of DCI, MAC, RRC, and system information (MIB or SIB).

Further, in a case where the code sequence length of an SRS is associated with a sub-band size, the terminal 100 can also calculate the extended part size of a code sequence from the sub-band size. In this case, the terminal 100 may set an offset value on the basis of the sub-band size instead of the extended part size. Further, as with an extended part size, a sub-band size in each frequency resource range may be notified in combination with one or more of DCI, MAC, RRC, and system information (MIB or SIB).

Note here that in a case where the puncture size of an SRS is larger than an extended part (or a repeated part), a pure ZC part may be punctured in addition to the extended part. When the pure ZC part is punctured, the properties (low PAPR/CM, low cross-correlation) of a ZC sequence may more greatly deteriorate than in a case where only the extended part (or the repeated part) is punctured.

Therefore, as shown in Specific Example 2, the terminal 100 and the base station 200 can increase the puncture size of an SRS of a large extended part size and reduce the puncture size of an SRS of a small extended part size. This makes it possible to suppress inter-numerology interference while reducing the possibility of the pure ZC part being punctured. Further, Specific Example 2 makes it possible to suppress deterioration in the properties of a ZC by a puncture and improve the accuracy of estimation of quality by an SRS.

Specific Example 3

Figure 20:
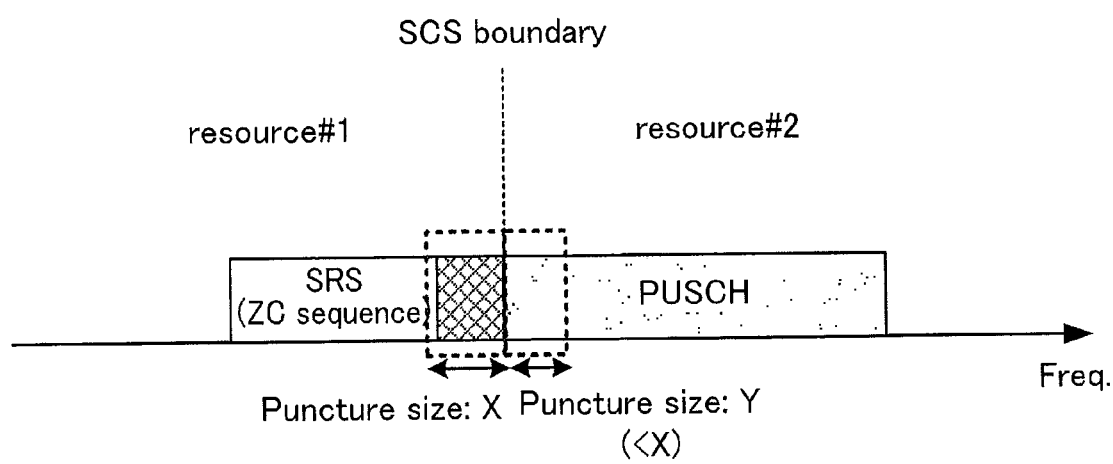
FIG. 20 shows an example of an SRS puncture process according to Specific Example 3 of Embodiment 1.

In Specific Example 3, as shown in FIGS. 20 and 21, the terminal 100 determines a puncture size by setting an offset value (X) on the basis of the channel type or service type of a signal assigned to a frequency resource adjacent to a frequency resource assigned an SRS.

Specifically, the terminal 100 makes an offset value (puncture size) for an SRS greater as the priority of the channel or service type of a signal assigned to an adjacent frequency resource becomes higher. In an example shown in FIG. 21, priority becomes higher in the order of a PUCCH, a PUSCH (physical uplink shared channel), and an SRS, and an offset value (puncture size) X for an SRS that the terminal 100 transmits is set to be greater in the order in which a signal assigned to a frequency resource adjacent to the frequency resource of the SRS that the terminal 100 transmits is a PUCCH, a PUSCH, and an SRS.

For example, in FIG. 20, a PUSCH is assigned to a frequency resource (resource #2) adjacent to the frequency resource (resource #1) of an SRS. In this case, as shown in FIG. 21, the terminal 100 sets an offset value X=3 for the SRS.

It should be noted that the channel type or service type of a signal assigned to an adjacent resource, which is puncturing control information, may be generated by the control information generator 201 of the base station 200 and notified in combination with one or more of DCI, MAC, RRC, and system information (MIB or SIB).

Thus, in Specific Example 3, as the priority of the channel or service type of a signal assigned to a frequency resource adjacent to the frequency resource of an SRS becomes higher, the offset value (puncture size) of the SRS is made greater. This makes it possible to better reduce interference that the SRS gives to a channel or service of higher importance of the adjacent frequency resource and improve the reception quality of the channel or service of the adjacent frequency resource.

It should be noted that, as shown in FIG. 22, as the offset value of an SRS becomes greater, an offset value (puncture size) that is applied to a channel or service of an adjacent frequency resource (e.g. a channel or service that another UE uses) may be made smaller. For example, a UE (not illustrated) that uses the channel or service of this adjacent frequency resource punctures a signal of the channel or service through the use of an offset value set as shown in FIG. 22. That is, as the priority of the channel or service of the adjacent frequency resource becomes higher, an offset value (puncture size) that is applied to the channel or service is set to be smaller. This makes it possible to increase a puncture size for an SRS of a more important channel or service and, at the same time, reduce a puncture size for the channel or service. By thus changing, according to the channel or service of an adjacent frequency resource, the puncture sizes of both an SRS and a signal of the channel or service, inter-numerology interference can be more suppressed.

Further, the channel types shown in FIG. 22 are examples and are not intended to be limited to these types. That is, an offset value for an SRS may be set for another channel type or service type (such as eMBB, URLLC, or mMTC).

Specific Example 4

In Specific Example 4, the terminal 100 determines a puncture size by setting an offset value (X) on the basis of the power spectral density (PSD) of an SRS and the PSD of a signal assigned to a frequency resource adjacent to a frequency resource assigned the SRS.

Specifically, the terminal 100 sets the offset value (puncture size) of an SRS to be greater as the PSD of a signal assigned to an adjacent resource becomes lower than the PSD of the SRS.

It should be noted that the PSD of a signal assigned to an adjacent resource, which is puncturing control information, may be generated by the control information generator 201 of the base station 200 and notified in combination with one or more of DCI, MAC, RRC, and system information (MIB or SIB).

Further, in a case where a PSD targeted for each type of channel is prescribed, the terminal 100 may change the offset value according to the type of channel as in the case of Specific Example 3.

Note here that as the PSD of a signal assigned to an adjacent frequency resource becomes lower, the effect of inter-numerology interference that an SRS gives becomes greater. On the other hand, in Specific Example 4, as the PSD of a signal assigned to an adjacent frequency resource becomes lower than the PSD of an SRS, the offset value (puncture size) of the SRS is made greater. This makes it possible to, even in a case where the PSD of a signal assigned to an adjacent frequency resource is low, more reduce interference that an SRS that the terminal 100 transmits gives to the signal and improve the reception quality of the adjacent frequency resource (channel).

The foregoing has described Specific Examples 1 to 4 in which to change the puncture size.

As described above, in the present embodiment, the terminal 100 determines, on the basis of a parameter of a frequency resource assigned an SRS and a parameter of an adjacent frequency resource of a different SCS, the puncture size in which to puncture the SRS at an SCS boundary.

With this, even in a case where an SRS is placed around an SCS boundary as shown in FIG. 3, a puncture size for the SRS can be appropriately determined in consideration of inter-numerology interference and the reception quality of a signal according to parameters (such as SCSs, extended part sizes, channel or service types, and PSDs) of a frequency resource assigned the SRS and an adjacent frequency resource.

Therefore, the present embodiment allows the terminal 100 to, even in a case where an SRS is placed at a boundary between frequency resources of different SCSs, appropriately generate and an SRS code sequence and transmit it.

Embodiment 2

Embodiment 1 has described a method for efficiently suppressing inter-numerology interference by, as shown in FIG. 3, determining a puncture size according to a frequency resource assigned an SRS and the position of an SCS boundary and, furthermore, adjusting the puncture size (e.g. an offset value) through the use of puncturing control information.

On the other hand, the present embodiment describes a method for puncturing an SRS in a case where, as shown in FIG. 4, there is an overlap between a frequency resource assigned the SRS and a frequency resource being used by a different channel or service.

It should be noted that a terminal and a base station according to the present embodiment are identical in basic configuration to the terminal 100 and the base station 200 according to Embodiment 1 and, as such, are described with continued reference to FIGS. 6 and 7. The present embodiment differs from Embodiment 1 in terms of how the puncture size determiner 105 of the terminal 100 and the puncture size determiner 208 of the base station 200 operate.

Specifically, the terminal 100 and the base station 200 puncture that part of a frequency resource assigned an SRS which overlaps a frequency resource assigned a different channel or service signal other than the SRS. That is, the terminal 100 and the base station 200 compare a frequency resource assigned an SRS and an adjacent frequency resource designated for use in transmission of a different channel or service and puncture the SRS (or a replica signal) in the overlapped frequency resource.

That is, the puncture size determiners 105 and 208 determine, as a puncture size, a region of overlap between a frequency resource assigned an SRS and an adjacent frequency resource designated for use in transmission of a different channel or service.

Note here that the term "different channel or service" refers, for example, to a URLLC, a CSI-RS (channel state information-reference signal), a PRS (positioning reference signal), a PUSCH, a PUCCH, an SS (synchronization signal), and a PBCH (physical broadcast channel). It should be noted that a different channel or service is not limited to these.

Resource information of these services or channels may be generated by the control information generator 201 of the base station 200 and notified in combination with one or more of DCI, MAC, RRC, and system information (MIB or SIB). Further, resources of an SS and a PBCH are prescribed by notification or specifications in the control information. It should be noted that since a CSI-RS, a PRS, an SS, and a PBCH are downlink control signals, a case where an SRS and frequency resources for these channels overlap is a case where full duplex is applied (i.e. a case where an uplink signal and a downlink signal are multiplexed into a frequency resource at the same timing).

Thus, the present embodiment allows the terminal 100 to, without notification of a puncture size or puncturing control information, puncture an SRS in a resource overlapped with a different channel. This allows reduction of a signaling overhead by which to notify a puncture size.

Further, in the present embodiment, the terminal 100 can prevent a collision between an SRS and a different channel by puncturing the SRS in a resource overlapped with the different channel, thus making it possible to improve reception performance.

Embodiment 3

A terminal and a base station according to the present embodiment are identical in basic configuration to the terminal 100 and the base station 200 according to Embodiment 1 and, as such, are described with continued reference to FIGS. 6 and 7.

As described in Embodiments 1 and 2, in a case where a puncture size calculated by the puncture size determiners 105 and 208 is large, the puncture size of an extended ZC sequence becomes larger, so that the properties (low PAPR/CM and low cross-correlation) of a ZC sequence may greatly deteriorate. In particular, in a case where the puncture size is larger than the size of an extended part (i.e. a repeated part), a pure ZC part is punctured, with the result that the deterioration in the properties of the ZC sequence becomes even greater.

To address this problem, in the present embodiment, in a case where the terminal 100 and the base station 200 have determined that the properties of an ZC sequence will deteriorate in a case where the ZC sequence is punctured in a puncture size determined, the terminal 100 and the base station 200 switch to a different SRS generating method in order to prevent deterioration in the properties of the ZC sequence.

The present embodiment differs from Embodiment 1 or 2 in terms of how the SRS generation instructor 106 of the terminal 100 and the SRS generation instructor 209 of the base station 200 operate.

Specifically, the SRS generation instructors 106 and 209 judge, on the basis of the puncture size of an SRS as calculated by the puncture size determiners 105 and 208, that the properties of a ZC sequence will deteriorate in a case where the puncture size is greater than a threshold, and switch to a different method for generating an SRS code sequence. Moreover, the SRS generation instructors 106 and 209 determine the sequence length (e.g. the size of a pure ZC part), sequence number, extended part size, puncture size, and the like of an SRS code sequence on the basis of the different SRS generating method.

Moreover, the SRS generator 107 and the replica generator 210 generate an SRS (replica signal) in accordance with the parameters determined by the SRS generation instructors 106 and 209. That is, the SRS generator 107 and the replica generator 210 change to a different SRS-generating method on the basis of the puncture size in which to puncture the SRS.

The following describes Specific Examples 1 to 3 of methods for generating an SRS code sequence (e.g. a ZC sequence).

Specific Example 1

In Specific Example 1, in a case where the puncture size satisfies Eq. (2) below, the SRS generation instructors 106 and 209 set the extended part of the SRS code sequence to "unsent". In other words, in a case where the puncture size satisfies Eq. (2) below, the SRS generation instructors 106 and 209 reset the puncture size to the extended part size (or the repeated part size).

[Math. 2]

$$P_{size}\alpha \le E_{size} \le P_{size}+\alpha \quad (2)$$

where $P_{size}$ is the puncture size, α is a threshold for switching to a different method for generating an SRS code sequence in Specific Example 1, and $E_{size}$ is the extended part size.

That is, in a case where the puncture size determined by the puncture size determiners 105 and 208 approximates to the extended part size, the SRS generation instructors 106 and 209 change the puncture size to the extended part size.

It should be noted that the threshold α may be prescribed by specifications and may be notified in combination with one or more of DCI, MAC, RRC, and system information (MIB or SIB).

Thus, in Specific Example 1, in a case where the terminal 100 and the base station 200 have judged, on the basis of the puncture size and the extended part size, that the properties of the ZC sequence will deteriorate, the terminal 100 and the base station 200 make the extended part unsent, i.e. make the pure ZC sequence an SRS code sequence. This makes it possible to prevent deterioration in the properties of the ZC sequence and maintain the properties of the ZC sequence. That is, the terminal 100 and the base station 200 set the puncture size so that the pure ZC sequence is not punctured.

Figure 23:
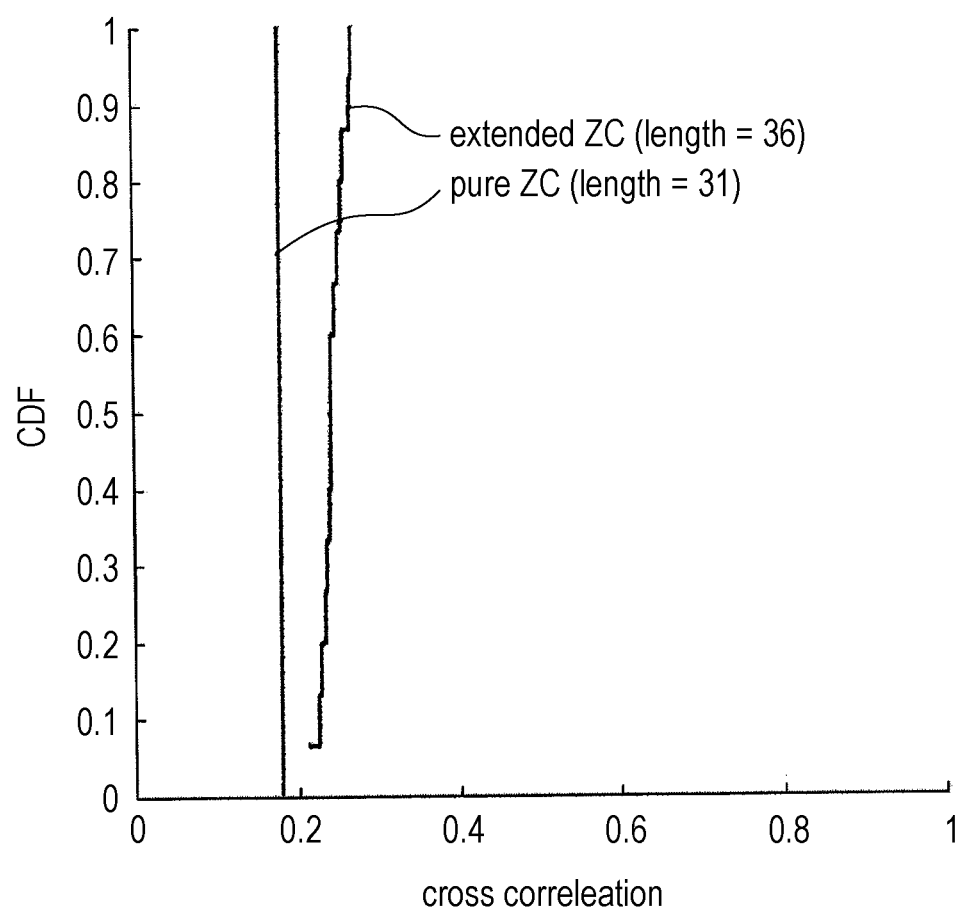
FIG. 23 shows the properties of a pure ZC and an extended ZC.

FIG. 23 shows examples of the cross-correlation properties of both an extended ZC sequence (i.e. extended part size >1) and a ZC sequence (i.e. the extended part size is 0). FIG. 23 shows that the cross-correlation properties are greatly improved by making the extended part size 0.

Therefore, according to Specific Example 1, the cross-correlation property of a ZC sequence is improved, whereby the accuracy of estimation of quality by an SRS can be improved.

Specific Example 2

Figure 24:
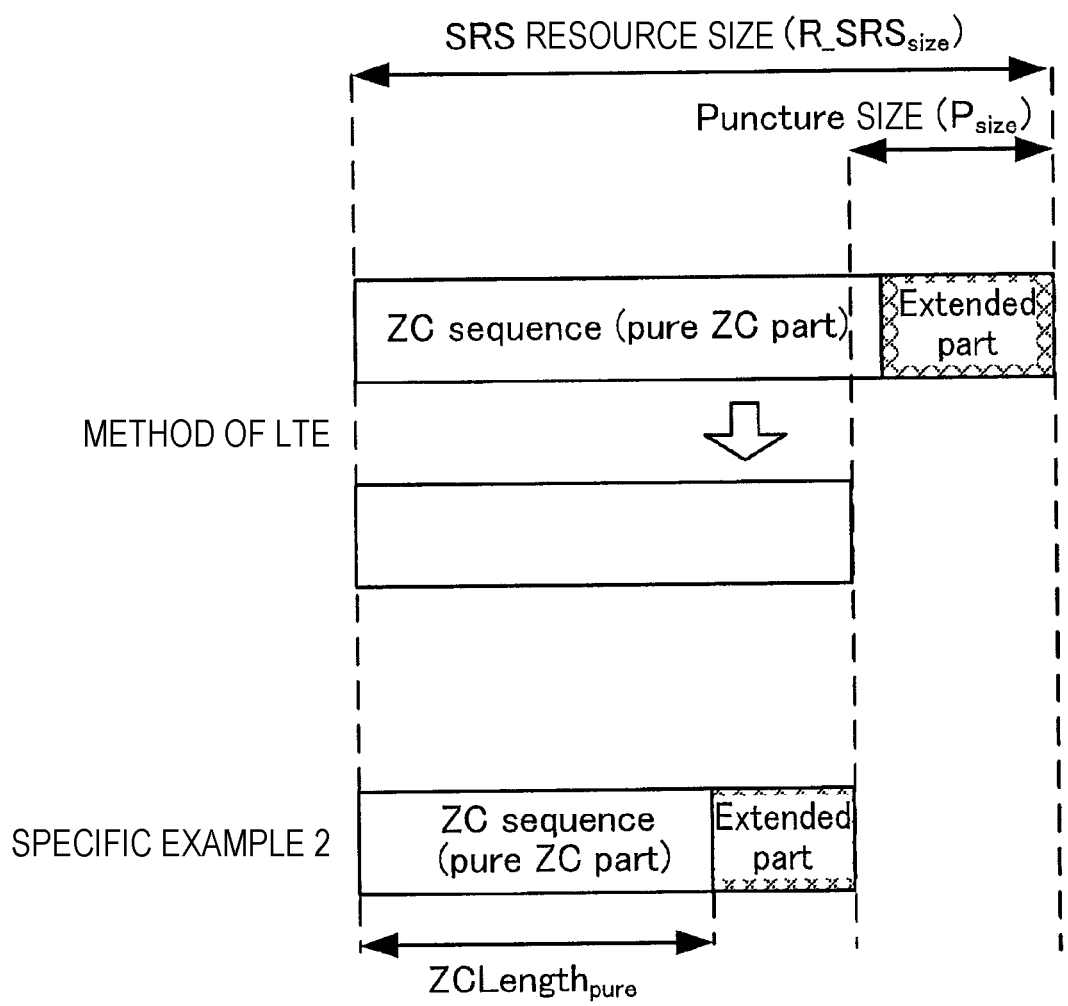
FIG. 24 shows an example of an SRS transmission method according to Specific Example 2 of Embodiment 3.

In Specific Example 2, in a case where the puncture size exceeds a threshold, the SRS generation instructors 106 and 209 configure the settings so that a new extended ZC sequence is generated on the basis of not a frequency resource (SR resource size) assigned an SRS (extended ZC sequence) as in the case of a method of LTE but a resource size obtained by subtracting the puncture size from an SRS resource size as shown in FIG. 24.

That is, in a case where the puncture size is equal to or greater than the threshold, the SRS generator 107 and the replica generator 210 generate, from a code sequence whose sequence length is a prime number that is equal to or less than a frequency resource size (second resource size) obtained by subtracting the puncture size from a frequency resource size (first resource size) assigned the SRS, an SRS of the second resource size.

For example, the sequence length ($ZCLength_{pure}$) of a pure ZC part that is used in generating a new extended ZC sequence is expressed by Eq. (3) as follows:

[Math. 3]

$$ZCLength_{pure}=\text{primes}(R\_SRS_{size}-P_{size}) \quad (3)$$

where $R\_SRS_{size}$ is an SRS resource size assigned to the terminal 100 and $P_{size}$ is the puncture size.

It should be noted that the function primes (X) means obtaining a maximum value from among all prime numbers that are equal to or less than X.

Further, the threshold may be prescribed by specifications and may be notified in combination with one or more of DCI, MAC, RRC, and system information (MIB or SIB).

For example, the threshold may be equal to the extended part size or may be a value that approximates to the extended part size. That is, as shown in FIG. 24, in a case where the puncture size determined by the puncture size determiners 105 and 208 is larger than the extended part size and the pure ZC part may be punctured, the SRS generation instructors 106 and 209 reconfigure the settings so that the sequence length ($ZCLength_{size}$) of a ZC sequence that is used for an SRS code sequence becomes shorter.

With this, as shown in FIG. 24, the pure ZC part is not punctured in an SRS code sequence that is newly generated.

That is, Specific Example 2 makes it possible to maintain the properties of the extended ZC sequence by generating an extended ZC sequence having a resource size obtained by subtracting the puncture size from the SRS resource size.

Figure 25:
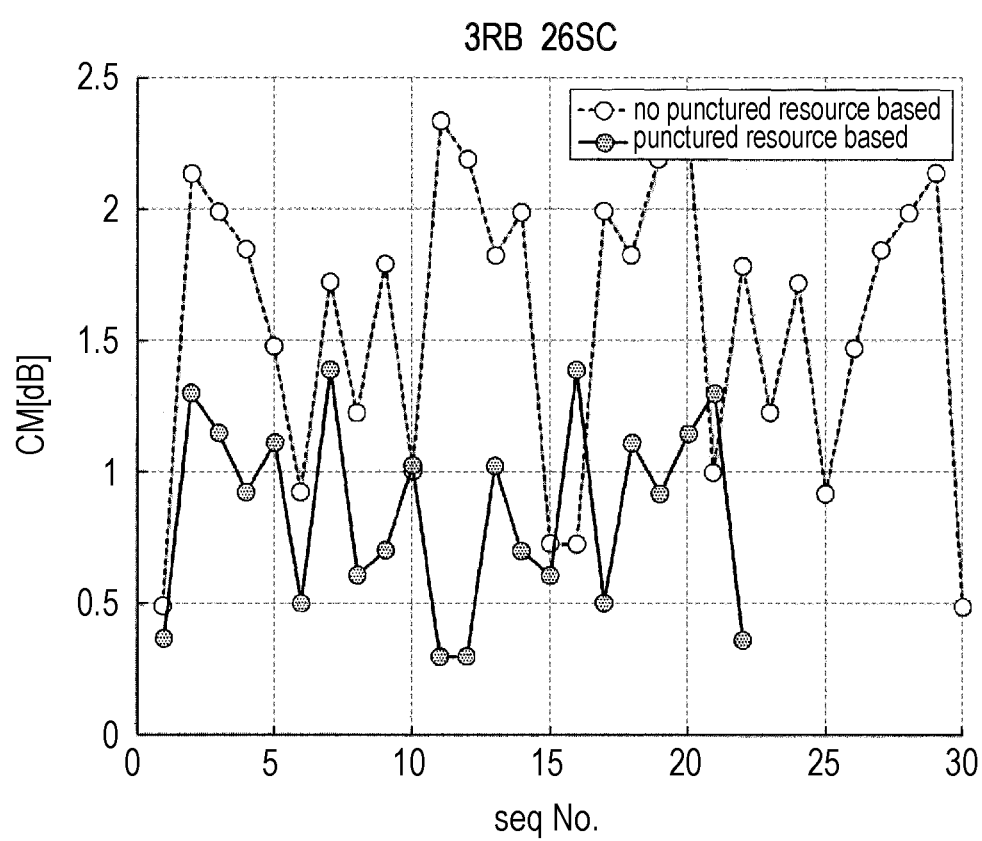
FIG. 25 shows a result of a computation simulation of the properties of a ZC sequence according to Specific Example 2 of Embodiment 3.

FIG. 25 shows results of evaluating, through computation simulations, the CM properties of a method ("no punctured resource based") for making a puncture after having generated an extended ZC sequence on the basis of an SRS resource size ($R\_SRS_{size}$) and a method ("punctured resource based") for generating an extended ZC sequence on the basis of a resource size ($R\_SRS_{size} - P_{size}$) obtained by subtracting a puncture size from an SRS resource size according to Specific Example 2, respectively. FIG. 25 shows that the method of Specific Example 2 brings about better CM properties than the method for making a puncture after having generated an extended ZC sequence on the basis of an SRS resource size.

Therefore, Specific Example 2 makes it possible to prevent a reduction in maximum transmission power of the terminal 100 due to deterioration in CM properties.

Specific Example 3

In Specific Example 3, in a case where the puncture size exceeds the threshold, the SRS generation instructors 106 and 209 configure the settings so that the SRS is dropped. That is, in a case where the puncture size is equal to or greater than the threshold, the terminal 100 (radio transmitter 109) drops the SRS.

It should be noted that the threshold may be prescribed by specifications and may be notified in combination with one or more of DCI, MAC, RRC, and system information (MIB or SIB).

For example, the threshold may be equal to the extended part size or may be a value that approximates to the extended part size.

Thus, in a case where the puncture size determined by the puncture size determiner 105 is larger than the extended part size and the pure ZC part too is punctured, the terminal 100 drops the SRS. By so doing, Specific Example 3 makes it possible to block the effect by which an SRS whose cross-correlation property has deteriorated due to deterioration in the properties of the extended ZC sequence by a puncture gives interference to another SRS.

The foregoing has described Specific Examples 1 to 3 of methods for generating an SRS code sequence.

Thus, in the present embodiment, the terminal 100 changes to a different SRS-generating method on the basis of the puncture size in which to puncture an SRS, and transmits an SRS generated through the use of the different method. With this, the present embodiment allows the terminal 100 to transmit an SRS punctured without deterioration in the properties of a code sequence. This makes it possible to suppress inter-numerology interference and, at the same time, more improve the accuracy of estimation of quality by the SRS.

The foregoing has described each of the embodiments of the present disclosure.

It should be noted that each of the embodiments of the present disclosure may be used in combination with another. For example, a method obtained by a combination of Embodiments 1 and 2 is described. For example, as described in Embodiment 2, in a case where after the puncture size of an SRS has been determined according to a resource of overlap between the SRS and a channel of an adjacent resource, the SCS of a resource assigned the SRS and the SCS of a channel of overlap between the SRS and the resource are different from each other, the terminal 100 may further add an additional puncture size change (see, for example, FIG. 13) based on the difference in SCS as described in Embodiment 1. This makes it possible to suppress interference that occurs due to the channel of overlap between the SRS and the resource, i.e. inter-numerology interference, and improve the accuracy of estimation of quality by the SRS.

Further, in a case of puncturing an SRS, the terminal 100 may increase the PSD of the SRS according to the puncture size or, regardless of the puncture size, may exercise control to make the PSD of the SRS constant. Increasing the PSD of the SRS in making a puncture brings about an effect of improving the reception quality of the SRS. Further, regardless of the presence or absence of a puncture, making the PSD constant makes a level of other-cell interference constant, making it possible to improve scheduling performance.

Further, DCI contains control information, added by NR, that is transmitted through a group-common PDCCH.

Further, the foregoing embodiments are not limited to SRSs but may be applied to different channels that use code sequences such as ZC sequences.

The present disclosure may be achieved with software, hardware, or software in cooperation with hardware. Each of the functional blocks used to describe the embodiments above may be partly or wholly achieved as LSIs, which are integrated circuits, and each of the processes described in the embodiments above may be partly or wholly controlled by a single LSI or a combination of LSIs. The LSIs may each be composed of individual chips, or may be composed of a single chip so as to include some or all of the functional blocks. The LSIs may each include an input and an output for data. Depending on the degree of integration, the LSIs may alternatively be referred to as "ICs", "system LSIs", "super LSIs", or "ultra LSIs". However, the technique of implementing an integrated circuit is not limited to LSI and may be achieved by using a dedicated circuit, a general-purpose processor, or a dedicated processor. In addition, an FPGA (field-programmable gate array) that can be programmed after the manufacture of an LSI or a reconfigurable processor in which the connections and the settings of circuit cells disposed inside an LSI can be reconfigured may be used. The present disclosure may be achieved as digital processing or analog processing. If future integrated circuit technology replaces LSI as a result of the advancement of semiconductor technology or other derivative technology, the functional blocks could be integrated using the future integrated circuit technology. For example, biotechnology can also be applied.

A terminal of the present disclosure includes: a circuit that, on the basis of a parameter of a first frequency resource assigned a reference signal and a parameter of a second frequency resource, adjacent to the first frequency resource, that uses a subcarrier spacing which is different from that used by the first frequency resource, punctures the reference signal at a boundary between the first frequency resource and the second frequency resource; and a transmitter that transmits the reference signal thus punctured.

In the terminal of the present disclosure, as the subcarrier spacing of the first frequency resource becomes larger than the subcarrier spacing of the second frequency resource, a puncture size in which to puncture the reference signal becomes larger.

In the terminal of the present disclosure, as the subcarrier spacing of the first frequency resource becomes larger, a puncture size in which to puncture the reference signal becomes larger.

In the terminal of the present disclosure, the reference signal is an extended code sequence composed of a part representing a code sequence and an extended part obtained by copying a part of the code sequence, and as a size of the extended part becomes larger, a puncture size in which to puncture the reference signal becomes larger.

In the terminal of the present disclosure, as a priority of a channel type or service type that is used by the second frequency resource becomes higher, a puncture size in which for the circuit to puncture the reference signal becomes larger.

In the terminal of the present disclosure, as a power spectral density (PSD) of a signal assigned to the second frequency resource becomes lower than a PSD of the reference signal, a puncture size in which to puncture the reference signal becomes larger.

A terminal of the present disclosure includes: a circuit that punctures that part of a frequency resource assigned a reference signal which overlaps a frequency resource assigned a different channel other than the reference signal; and a transmitter that transmits the reference signal thus punctured.

A terminal of the present disclosure includes: a circuit that, on the basis of a puncture size in which to puncture a reference signal, changes to a different method for generating the reference signal; and a transmitter that transmits the reference signal generated by using the different method.

In the terminal of the present disclosure, the reference signal is an extended code sequence composed of a part representing a code sequence and an extended part obtained by copying a part of the code sequence, and in a case where the puncture size is equal to or greater than a threshold, the circuit changes the puncture size to a size of the extended part.

In the terminal of the present disclosure, in a case where the puncture size is equal to or greater than a threshold, the circuit generates, from a code sequence whose sequence length is a prime number that is equal to or less than a second resource size obtained by subtracting the puncture size from a first resource size assigned the reference signal, a reference signal of the second resource size.

In the terminal of the present disclosure, the transmitter drops the reference signal in a case where the puncture size is equal to or greater than a threshold.

A communication method of the present disclosure includes: on the basis of a parameter of a first frequency resource assigned a reference signal and a parameter of a second frequency resource, adjacent to the first frequency resource, that uses a subcarrier spacing which is different from that used by the first frequency resource, puncturing the reference signal at a boundary between the first frequency resource and the second frequency resource; and transmitting the reference signal thus punctured.

A communication method of the present disclosure includes: puncturing that part of a frequency resource assigned a reference signal which overlaps a frequency resource assigned a different channel other than the reference signal; and transmitting the reference signal thus punctured.

A communication method of the present disclosure includes: on the basis of a puncture size in which to puncture a reference signal, changing to a different method for generating the reference signal; and transmitting the reference signal generated by using the different method.

An embodiment of the present disclosure is useful to a mobile communication system.

REFERENCE SIGNS LIST

100 Terminal
101, 205 Antenna
102, 206 Radio receiver
103 Demodulator-decoder
104, 202 Control information retainer
105, 208 Puncture size determiner
106, 209 SRS generation instructor
107 SRS generator
108 Resource assigner
109, 204 Radio transmitter
200 Base station
201 Control information generator
203 Modulator-coder
207 Demodulator-decoder
210 Replica generator
211 Quality estimator
212 Scheduler

The invention claimed is:

1. A terminal comprising:
   circuitry, which, in operation, punctures a reference signal that is to be transmitted at a boundary between a first frequency resource assigned to the reference signal and a second frequency resource that is adjacent to the first frequency resource based on a parameter of the first frequency resource and a parameter of the second frequency resource, wherein a subcarrier spacing in the first frequency resource is different from a subcarrier spacing in the second frequency resource; and
   a transmitter, which, in operation, transmits the reference signal as punctured by the circuitry.

2. The terminal according to claim 1, wherein as the subcarrier spacing of the first frequency resource becomes larger than the subcarrier spacing of the second frequency resource and increases, a puncture size of part of the reference signal punctured by the circuitry increases.

3. The terminal according to claim 1, wherein as the subcarrier spacing of the first frequency resource increases, a puncture size of part of the reference signal punctured by the circuitry increases.

4. The terminal according to claim 1, wherein the reference signal is an extended code sequence composed of a part representing a code sequence and an extended part obtained by copying a part of the code sequence, and
   as a size of the extended part increases, a puncture size of part of the reference signal punctured by the circuitry increases.

5. The terminal according to claim 1, wherein as a priority of a channel type or service type that is in the second frequency resource increases, a puncture size of part of the reference signal punctured by the circuitry increases.

6. The terminal according to claim 1, wherein as a power spectral density (PSD) of a signal assigned to the second frequency resource becomes lower than a PSD of the reference signal, a puncture size of part of the reference signal punctured by the circuitry increases.

7. A terminal comprising:
   circuitry, which, in operation, punctures part of a reference signal that is assigned to a first frequency resource which overlaps a second frequency resource to which a channel other than the reference signal is assigned; and a transmitter, which, in operation, transmits the reference signal as punctured by the circuitry.

8. A terminal comprising:
circuitry, which, in operation, changes from generating a reference signal using a first method to a generating the reference signal using a second method based on a puncture size of part of the reference signal punctured by the circuitry, wherein the first method is different from the second method; and
a transmitter, which, in operation, transmits the reference signal generated using the second method.

9. The terminal according to claim 8, wherein the reference signal is an extended code sequence composed of a part representing a code sequence and an extended part obtained by copying a part of the code sequence, and
in a case where the puncture size is equal to or greater than a threshold, the circuitry changes the puncture size to a size of the extended part.

10. The terminal according to claim 8, wherein in a case where the puncture size is equal to or greater than a threshold, the circuitry generates, from a code sequence whose sequence length is a prime number that is equal to or less than a second resource size obtained by subtracting the puncture size from a first resource size assigned the reference signal, a reference signal of the second resource size.

11. The terminal according to claim 8, wherein the transmitter, in operation, drops the reference signal in a case where the puncture size is equal to or greater than a threshold.

12. A communication method comprising:
puncturing a reference signal that is to be transmitted at a boundary between a first frequency resource assigned to the reference signal and a second frequency resource that is adjacent to the first frequency resource based on a parameter of the first frequency resource and a parameter of the second frequency resource, wherein a subcarrier spacing in the first frequency resource is different from a subcarrier spacing in the second frequency resource; and
transmitting the reference signal as punctured by the puncturing.

13. A communication method comprising:
puncturing part of a reference signal that is assigned to a first frequency resource which overlaps a second frequency resource to which a channel other than the reference signal is assigned; and
transmitting the reference signal as punctured by the puncturing.

14. A communication method comprising:
changing from generating a reference signal using a first method to generating the reference signal using a second method based on a puncture size of part of the reference signal that is to be punctured, wherein the second method is different from the first method; and
transmitting the reference signal generated using the second method.

* * * * *